United States Patent [19]

Heinz, Jr.

[11] 4,052,533

[45] Oct. 4, 1977

[54] PRESSURE RELIEF FLAPPER VENT VALVE FOR GALVANIC CELLS

[75] Inventor: Henry Heinz, Jr., Berea, Ohio

[73] Assignee: Union Carbide Corporation, New York, N.Y.

[21] Appl. No.: 671,673

[22] Filed: Mar. 29, 1976

[51] Int. Cl.² .......................................... H01M 2/12
[52] U.S. Cl. .................................... 429/54; 429/171
[58] Field of Search ................. 429/53, 54, 72, 82, 429/86, 164–173, 133–135

[56] References Cited

U.S. PATENT DOCUMENTS

| 1,650,319 | 11/1927 | Briggs | 429/54 |
| 3,278,340 | 10/1966 | Bell | 429/54 |
| 3,573,106 | 3/1971 | Johnson et al. | 429/135 |

FOREIGN PATENT DOCUMENTS

| 275,977 | 7/1914 | Germany | 429/54 |
| 7,110,727 | 3/1966 | Japan | 429/171 |

Primary Examiner—Donald L. Walton
Attorney, Agent, or Firm—Cornelius F. O'Brien

[57] ABSTRACT

A galvanic dry cell having a resealable subseal comprising a cup-shaped flapper vent valve having an opening at its center for receiving and contacting the cell's current collector rod and a peripheral edge segment contacting and conforming to the inner wall of the cell's container and adapted for deflecting upwardly thereby providing a resealable vent path at the valve-container interface.

13 Claims, 7 Drawing Figures

PRESSURE RELIEF FLAPPER VENT VALVE FOR GALVANIC CELLS

FIELD OF THE INVENTION

This invention relates to a resealable galvanic dry cell, and more particularly to a low pressure resealable flapper vent valve for releasing excessive gas pressure from inside a galvanic dry cell.

BACKGROUND OF THE INVENTION

Conventional galvanic dry cells for use in flashlights, toys or other sundry devices generally comprise a cylindrical container, such as a zinc anode can, with a depolarizer mix filling most of the container and having a carbon rod in the center which functions as the current collector for the depolarizer mix. The cells are generally provided with a subseal or inner seal which may comprise a layer of solidified molten wax or asphalt poured over a paper washer located just above the cathode depolarizer mix. Alternatively, the cells may be provided with a subseal comprising a wax bead sealed plastic washer disposed over the depolarizer mix. These subseals are reasonably effective in sealing off the depolarizer mix on shelf storage but if for any reason the cell develops excessive gas, the subseal may crack or rupture thereby enabling the gas to escape past or through a gas permeable outer seal. Once this occurs, the life span of the cell is potentially shortened by moisture loss and oxygen ingress.

Other types of galvanic cells may generate large quantities of gas under certain conditions during use. Since this type of cell is required to be tightly sealed at all times in order to prevent loss of electrolyte by leakage, high internal gas pressures may develop. Such pressures may cause leakage, bulging or possible expolsion of the cell if not properly vented. If a vent valve is employed, it must be resealable in order to avoid drying out of the electrolyte over the life of the cell and to prevent ingress of oxygen from the atmosphere which can cause wasteful corrosion of the anode.

In the past, several different types of resealable pressure relief vent valves have been used for releasing high internal gas pressures from inside a sealed galvanic cell. One type of valve that has been commonly used consists basically of a valve member such as a flat rubber gasket which is biased into sealing position over a vent orifice by means of a resilient member such as a helical spring. The resilient member or spring is designed to yield at a certain predetermined internal gas pressure so as to momentarily break the seal and allow the gas to escape through the vent orifice.

Another type of resealable pressure relief vent valve that has been tried is that disclosed and claimed in U.S. Pat. No. 3,293,081 issued to J. L. S. Daley on Dec. 20, 1966. This resealable vent valve basically includes an annular seal gasket such as an O-ring which is maintained in sealing position around the periphery of the vent orifice by means of an arc shaped resilient member or spring. The resilient member or spring is designed to yield and permit radial movement of the seal gasket so as to momentarily break the seal and allow the passage of gas through the vent orifice when a predetermined high internal gas pressure is reached in the cell.

Another type of resealable vent for dry cells consists of a metal ball overlying a vent opening and biased into sealing engagement around the vent opening by means of a coil spring. The vent opens to release gas from inside the cell when the internal gas pressure reaches a predetermined limit as set by the coil spring. Once the internal gas pressure has been relieved, the coil spring causes the ball to reseat and to reseal the vent.

Another type of resealable vent is disclosed in U.S. Pat. No. 3,415,690 to Richman issued on Dec. 10, 1968. In this vent, a flat elastomeric seal gasket overlies the vent opening and is retained in place by a resilient terminal cap on the top of the cell. This vent operates in basically the same manner as the vents previously described.

In U.S. Pat. No. 3,664,878 to Amthor issued on May 23, 1972, a resealable vent is disclosed which comprises a resilient deformable ball of elastomeric material positioned to overlie a vent orifice provided within the cell's container. A retainer means is positioned over the resilient ball for maintaining the ball in place over the vent orifice and in contact with a valve seat provided around the peripheral edge portions of the vent orifice and for compressing and deforming the resilient ball into a flattened configuration forming a normally fluid-tight seal between the flattened ball and the valve seat. The resilient ball is capable of undergoing further temporary deformation upon the buildup of predetermined high internal gas pressure inside the container so as to momentarily break the seal and allow gas to escape through the vent orifice.

A major problem encountered with resealable pressure relief vent valves of the types just described is that they are bulky and/or difficult to incorporate into the cell assembly. Furthermore, these pressure relief vent valves are expensive to manufacture and most are not adaptable for incorporation into miniature size cells. In addition, some of the prior art resealable vents as exemplified by the foregoing patents are not suitable for low pressure venting.

It is, therefore, an important object of this invention to provide a compact and economical low pressure resealable flapper vent valve for use in a galvanic dry cell.

Still another object of this invention is to provide a resealable flapper vent valve for galvanic dry cells which comprises a cup-shaped washer which is easy to assemble and inexpensive to manufacture.

Another object of this invention is to provide a resealable flapper vent valve that is adaptable to various diameters of drawn or extruded cell containers.

Another object of this invention is to provide a resilient cup-shaped washer as a vent subseal member for galvanic dry cells.

The foregoing and additional objects will become more fully apparent from the following description and the accompanying drawings.

SUMMARY OF THE INVENTION

The invention relates to a low pressure resealable subseal for galvanic cells. Specifically, the invention relates to a galvanic cell which comprises a container, such as a consumable anode container or a container having an anode liner or the like; a depolarizer-cathode within said container; a porous separator disposed between said anode and said depolarizer-cathode; an electrolyte wetting said depolarizer-cathode; a current collector rod embedded within and projected above said depolarizer-cathode; and a resealable flapper vent valve disposed concentrically about and contacting the current collector rod over the depolarizer-cathode and contacting the inner wall of the container so as to provide a resealable vent valve for releasing excessive gas pressure within the container, said resealable flapper vent valve comprising a resilient, deformable cupped annulus having an opening at its center through which the top of the current collector rod passes and projects above, and having its peripheral edge segment deflected upwardly such that the bottom peripheral edge of the annulus contacts the inner wall of the container.

The flapper vent valve should be made of a material sufficiently resilient so that the outer segment of the valve when disposed within the cell's container will deflect upwardly such that its bottom peripheral edge contacts and conforms to the inner wall of the container without having edge gaps or wrinkles.

As used herein, a cupped annulus shall mean one that has a relatively flat inner segment which extends radially outward in an upward curved manner such that the cross section of the annulus resembles a dish-shaped member or one that has a radial cross section having a substantially concave or flat upper surface and a substantially convex lower surface.

Prior to being inserted into a cell, the flapper vent valve of this invention could be a flat annulus or a slightly cupped annulus having an outer diameter larger than the internal diameter of the cell's container such that when the disc is forced over the cell's cathode collector rod and into the cell, the peripheral edge of the annulus will deflect upwardly thereby forming a cupped-annular configuration in the container. Thus low pressure gas buildup within the cell could easily deflect the peripheral segment of the valve upward and escape along or through the valve-container interface. Contrary to this, pressure on top of the valve would only provide a better seal at the interface of the valve and container thereby preventing the ingress of gas, such as oxygen, from the atmosphere. The flapper vent valve of this invention is ideally suited as a low pressure resealable subseal for galvanic cells, such as Leclanche cells, zinc chloride cells, magnesium cells, etc. In practice, the flapper vent valve of this invention will provide a relatively tight resealable subseal for a galvanic cell while a gas permeable outer seal can be provided in the conventional manner.

Materials suitable for use in making the flapper vent valve of this invention are rubber, both synthetic and natural, such as neoprene (neoprene is the generic name for a synthetic rubber-like polymer made by polymerizing chloroprene [2-chloro-1,3-butadiene] or by polymerizing a mixture of polymerizable monomers, the major component of which is chloroprene), GR-S rubber (standard GR-S is a copolymer of butadiene and styrene in the ratio of approximately 76.5 to 23.5 percent), etc and other elastomers such as polyurethane, polyvinyl chloride, polyethylene, polypropylene, etc, and cellular plastic or the like.

Of the above, neoprene, including closed cell neoprene, has been found admirably suited for use in this invention. Although the composition of neoprene is as identified above, the term has been somewhat broadened through common usage and for the purpose of this invention to include commercial rubber-like compounds in which the major elastomeric constituent is neoprene.

The flapper vent valve of this invention must be sufficiently resilient so that it can be flexed as it is being inserted into a cell's container where it can then conform to and contact the inner wall of the container while assuming a cupped-annular configuration. Due to the resilient characteristics of the material forming the cupped-annular valve assembled in a cell's container, low pressure gas within the container will provide a sufficient force to effectively deflect the peripheral segment of the valve upwardly so as to enable the gas to vent at the valve-container interface. Once the gas pressure decreases, the resilient characteristics of the valve material will force the valve into sealing contact with the inner wall of the container. The flapper vent valve of this invention is admirably suited for venting gas in the range of about 5 to 35 psi from within a cell. It is to be understood that by the proper selection of the dimensions of the flapper vent valve in relation to the internal diameter of standard size cell containers, the flapper vent valve can be made to vent gas from within the container after the gas has increased to a preselected pressure level and then to reseal the container after the gas has decreased below the preselected pressure level.

Commercial conventional cylindrical dry cells suitable for this invention, such as Leclanche cells, are of two main types. In the "pasted" cell, the wet cathode depolarizer mix is impact or pressure molded to form a cylindrical bobbin containing a central current collector rod. This bobbin is later inserted into a cylindrical metal anode container together with a flowable separator paste or colloidal mass which is cooked or otherwise gelled to form an immobilized separator member between the metal container and the mix bobbin. In the construction of bobbin type cells a substantial amount of the total cell electrolyte is added by was of the separator paste.

In the "lined" cell, the separator is applied to the inside wall of the metal container either as an adherent film or coating or as an inserted layer of coated paper, for example. The wet cathode mix is extruded or rammed into position to fill a major portion of the lined container and then the central current collector rod is inserted directly into the rammed mix or into a hole made by a piercing rod. In this construction, virtually all of the cell electrolyte is added by way of the wet mix, which is, therefore, much wetter than used to mold bobbins.

The flapper vent valve of this invention is designed with a suitable opening or aperture at its center adapted for sliding over and maintaining contact with the current collector rod so as to effectively provide another potential venting path between the current collector rod and the valve in addition to the venting path between the valve and the container.

If desired, a light film of grease such as silicone grease or petroleum based grease may be applied at the valve-container interface and/or the valve-collector-rod interface as a sealing aid. In addition, if it is desired to limit the escape path for the gas within the cell to the valve-container interface, then at the valve-collector-rod interface, a layer bead or film of asphalt, shellac, fatty polyamide adhesive, etc. could be applied so as to effectively permanently seal this interfacial area and thereby prevent gas from venting therethrough. Thus at the valve-container interface, the low pressure gas would vent. If desired, a permanent sealant could also be placed at preselected area portions at the valve-container interface thereby providing one means for control over the vent and reseal pressures for the cell.

The material for the flapper vent valve for use in this invention can preferably have a hardness up to about 80 on the Durometer scale and for most applications could have a thickness of from about 0.0625 inch (0.159 cm) to about 0.25 inch (0.635 cm). It is understood that the material of the flapper vent valve should be stable in the presence of the other cell components, possess the desired mechanical properties of resilience, and be resistant to hardening and to permanent set.

Because the flapper vent valves of this invention can be used for cells that will vent at relatively low pressures, they are admirably suited for use as resealable venting valves for Leclanche, zinc chloride and magnesium cells.

The present invention will become apparent from the following description thereof when considered together with the accompanying drawings which are set forth as being exemplary of embodiments of the present invention and are not intended, in any way, to be limitative thereof and wherein.

Figure 1:
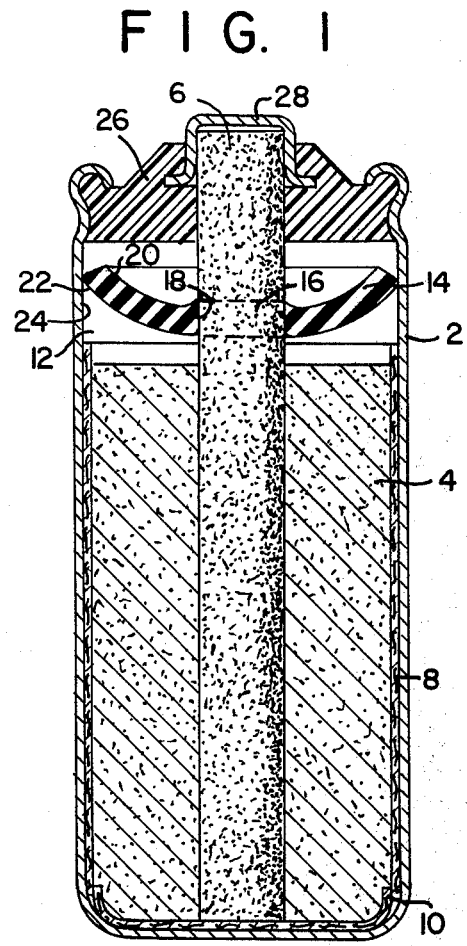
FIG. 1 is a sectional elevation taken through a dry cell embodiment of the present invention.

Referring in detail to FIG. 1, there is shown a partially assembled typical galvanic dry cell including a cylindrical container 2 which is made of an electrochemically consumable metal such as zinc and which serves as the anode for the cell. The cell container 2 includes therein a cathode depolarizer mix cake 4 containing, for example, manganese dioxide, a conductive material, such as carbon black, and an electrolyte. The cathode depolarizer mix cake 4 could be molded around a central cathode collector rod 6 or the cathode depolarizer mix 4 could be fed into container 2 as a wet mix containing virtually all of the cell's electrolyte and then the cathode collector rod 6 forced down into the center of the depolarizer mix 4. The cathode collector rod 6 could be a carbon rod impregnated with a wax or an organic resin to render it both liquid and gas impermeable. Whether the depolarizer mix is molded into a bobbin type structure in a separate operation prior to cell assembly or fed directly into the container 2 and packed therein, the cathode collector rod 6 is positioned such that its upper end protrudes through the open end of the container 2. A separator 8 surrounds the cathode depolarizer mix 4 and separates it from the inner side wall of the container 2 while a bottom cup separator 10 separates the depolarizer mix 4 from the bottom inner surface of the container 2. The separator may be a thin film separator e.g., a thin bibulous paper coated with a paste. Above the depolarizer mix is shown the usual air space 12 to accommodate any liquid spew that may be formed on discharge of the cell.

A resilient flapper vent valve member or subseal 14 having an opening 16 at its center is disposed such that the collector rod 6 passes through said opening 16 while its peripheral segment is deflected upwardly forming a cupped-annular cross section. Since the valve member is made of a resilient material, the diameter of opening 16 could be less than the diameter of the cathode collector rod 6 so as to provide a friction fit therebetween. The interface 18 of the rod 6 and valve member 14 would thus provide a potential low pressure resealable venting passage for gas buildup within the cell. Note that a predetermined level of gas pressure within space 12 could effectively deflect the subseal valve member 14 at the valve-collector-rod interface thus enabling the gas to vent. Optionally, a thin film of grease such as silicone or petroleum base grease could be applied at the valve-rod interface 18 to facilitate the assembly of the valve member 14 over the rod 6 and also to facilitate the deflection of valve 14 at said interface 18 for venting gas thereat from within the cell. Alternatively, a thin film of a sealant such as asphaltic lacquer may be applied to the upper portion of the collector rod 6 and/or the inner wall of opening 16 in valve member 14 prior to assembly so as to provide a permanent seal at the valve-rod interface 18.

The peripheral segment 20 of valve member 14 is deflected upwardly such that at least its bottom edge 22 conforms to and contacts the inner wall 24 of container 2. Thus low pressure gas from within container 2 could deflect edge 22 away from wall 24 and thereby escape from space 12. As discussed above, pressurized gas on the top surface of valve member 14 would force the outer edge of the valve member further against wall 24 thereby increasing the quality of the seal thereat. Consequently, the flapper vent valve 14 of this invention will allow gas to vent from within the cell while preventing atmospheric gases from entering the cell. Thus the flapper vent valve 14 provides an excellent subseal for galvanic dry cells. Optionally, a thin film of grease such as silicone or petroleum base grease could be applied at the valve-container interface to facilitate the assembly of the valve member 14 within the cell and also to facilitate the deflection of the peripheral edge of valve member 14 for venting gas from within the cell. If desired, a thin film of a sealant may be applied to at least a portion of the valve-container interface so as to seal said portion thereby limiting the venting of internal gas to any remaining unsealed portions or at the valve-rod interface.

Disposed on top on the container 2 is a plastic closure or cover 26 molded with an electrode terminal cap 28 at its center. The cover 26 should be a rigid structure and could be made of plastic. The container 2 can be crimped and radially squeezed into cover 26 by using conventional techniques. By properly relating the dimensions of the component parts of the cell, the flapper vent valve member 14 can be deflected sufficiently to insure that internal gas will vent between the valve-container interface and/or valve-collector rod interface upon reaching a preselected pressure level and then when the pressure decreases below this level, the valve will automatically return to its assembled position thereby resealing the cell. The material and size of the valve member along with the size of the container of the cell can be used to determine the pressure at which the gas will vent. For most applications, the valve member can be designed so as to vent gas at pressures in the range of 5 to 35 psi.

Figure 3:
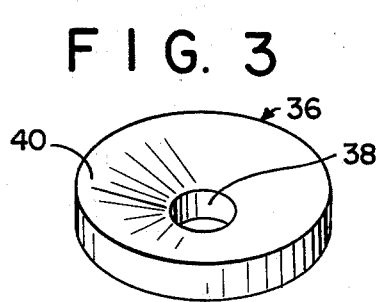
FIG. 3 is a perspective view of another type of flapper vent valve member prior to assembly in a dry cell.
Figure 2:
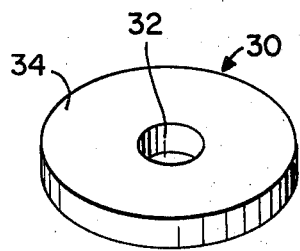
FIG. 2 is a perspective view of a flapper vent valve member prior to assembly in a dry cell.

FIGS. 2 and 3 show two types of flapper vent valve members suitable for use in this invention. The valve members in these Figures are shown prior to their assembly into a cell. Specifically, FIG. 2 shows a resilient flat valve member 30 having an opening 32 at its center adapted for sliding over and making contact with the collector rod of the cell. The outer diameter of valve member 30 has to be larger than the internal diameter of the container in which it is to be used so that upon being inserted into the container, the outer segment 34 of the valve member 30 will deflect upwardly and conform to the internal configuration of the container as shown in FIG. 1 for valve member 14. Since the valve member of this invention will form a cup-or dish shaped member when assembled in a cell, the valve member may initially be molded or preformed to a cupped-shaped structure 36 as shown in FIG. 3. Specifically, resilient flapper vent valve 36 has an opening 38 at its center adapted for sliding over and making contact with the collector rod of the cell and a peripheral edge segment 40 curved upwardly to form a slight overall cupped-shaped structure. The outer diameter of valve 36, like the other diameter of valve 30 of FIG. 2, has to be larger than the internal diameter of the container in which it is to be used so that upon being inserted into the container, the outer segment 40 will be deflected further upwardly to form a more pronounced cupped-shaped member having its bottom outer edge contacting the container as shown in FIG. 1 for element 14.

Figure 6:
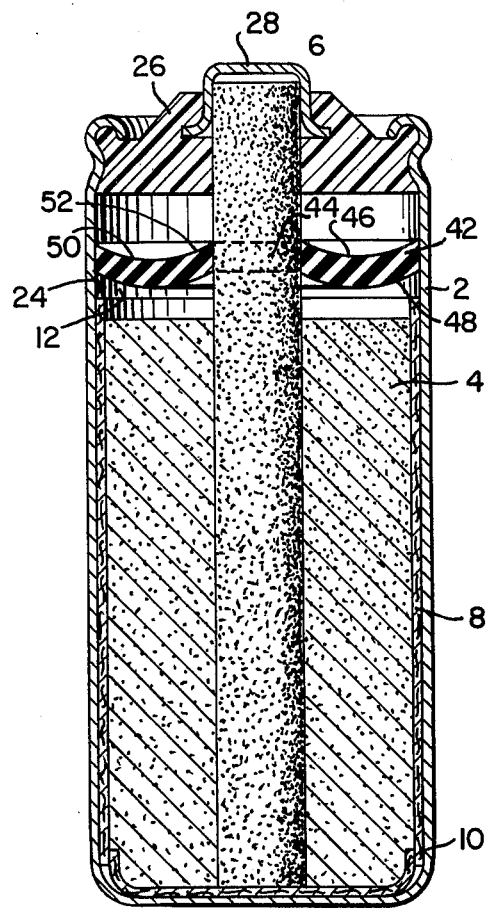
FIG. 6 is a sectional elevation taken through a dry cell embodiment of the present invention in which the flapper vent valve of FIG. 4 is employed.
Figure 4:
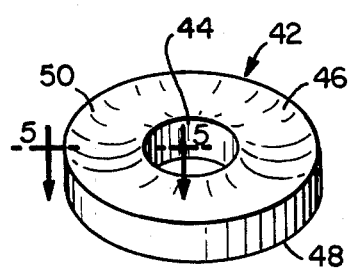
FIG. 4 is a perspective view of still another type of flapper vent valve member prior to assembly in a dry cell.
Figure 5:
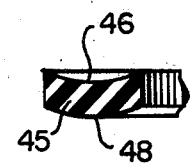
FIG. 5 is a cross-sectional view of the flapper vent valve member of FIG. 4 taken through line 5—5.

FIG. 4 shows another type of flapper vent valve 42 having an opening 44 at its center adapted for sliding over and making contact with the collector rod of the cell. FIG. 5 shows the radial cross-sectional area 45 of the flapper vent member 42 taken along line 5—5. As shown in FIGS. 5 and 6, radial cross section 45 comprises an upper surface 46 having a concave shape with a lower surface 48 having a convex shape. As discussed above, the outside diameter of flapper valve 42 has to be larger than the internal diameter of the container in which it is to be used so that upon being inserted into the container the outer segment 50 of valve member 42 will fit snugly within and conform to the internal configuration of the container. FIG. 6 shows a cross section of an assembled cell having the same component parts and identified with the same reference numbers as shown in FIG. 1 except that the flapper vent member 14 has been replaced with the flapper vent member 42 shown in FIGS. 4 and 5. Note specifically that in addition to the outward segment 50 of valve member 42 being deflected upwardly, the inner segment 52 is also deflected upwardly thereby providing an overall radial cross sectional area having a substantially concave upper surface 46 and a substantially convex lower surface 48.

Figure 7:
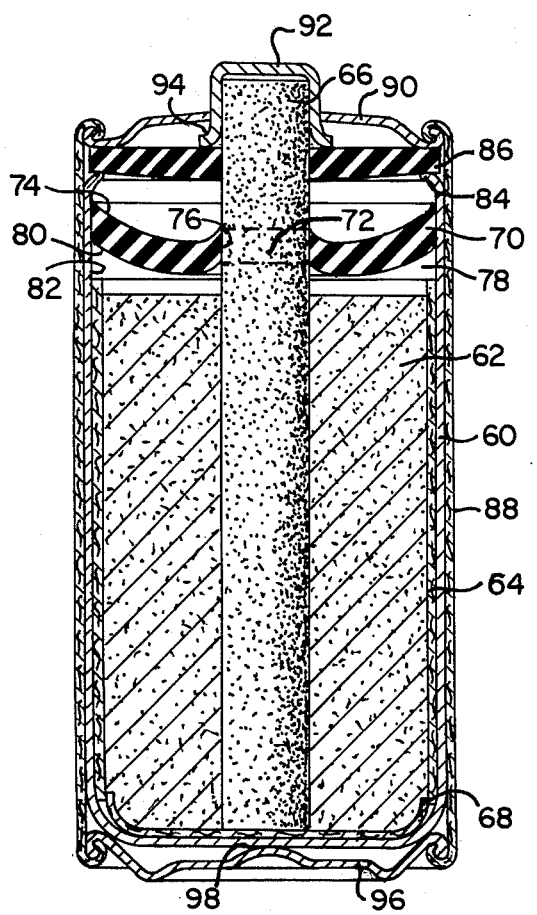
FIG. 7 is a sectional elevation taken through another dry cell embodiment of the present invention.

FIG. 7 illustrates another embodiment of a cell in accordance with this invention. Specifically FIG. 7 shows an assembled dry cell including a cylindrical conductive container 60, for example, a zinc container, having therein a cathode depolarizer mix cake 62. Centrally disposed in depolarizer mix 62 is a current collector rod 66 which protrudes above the open end of the cylindrical container 60. A separator 64 surrounds the cathode depolarizer mix 62 and separates the depolarizer mix 62 from the inner side wall of the conductive container 60 while a bottom cup 68 separates the depolarizer mix 62 from the inner surface of the container. As stated above in conjunction with FIG. 1, the separator may be a thin bibulous paper coated with a paste.

A resilient flapper vent valve member or subseal 70 having an opening 72 at its center is shown disposed such that the collector rod 66 passes through said opening 72 while its peripheral segment 74 is deflected upwardly forming a cupped-shaped annular member. Since the valve member 70 is made of a resilient material, the diameter of opening 72 could be less than the diameter of the cathode collector rod 66 so as to provide a friction fit therebetween. The interface 76 of current collector rod 66 and valve 70 would thus provide a potential low pressure resealable venting passage for gas within the cell. Note that a predetermined level of gas pressure within space 78 could effectively deflect the subseal member 70 at the valve-rod interface thus enabling the gas to vent. Optionally a thin film of grease, such as silicone or petroleum base grease could be applied at the valve-rod interface 76 to facilitate the assembly of flapper vent valve member 70 over rod 66 and also to facilitate the deflection of valve 70 at said interface 76 for venting gas thereat from within the cell. Alternatively, a thin film of sealant, such as an asphaltic lacquer, may be applied to the upper portion of the collector rod 66 and/or the inner wall of opening 72 in valve 70 prior to assembly so as to provide a permanent seal at the valve-rod interface 76.

The peripheral segment 74 of valve member 70 is deflected upwardly such that at least its bottom edge 80 conforms to and contacts the inner wall 82 of container 60. Thus low pressure gas from within container 60 could deflect edge 80 away from wall 82 and thereby escape from space 78. As discussed in conjunction with FIG. 1, pressurized gas on the top surface of valve member 70 would force the outer edge 80 of the valve member 70 further against wall 82 thereby increasing the quality of the seal thereat. Consequently, the flapper vent valve 70 will allow gas to vent from within the cell while preventing atmospheric gases from entering the cell. Thus the flapper vent valve 70 provides an excellent subseal for galvanic dry cells. Optionally, a thin film of grease such as silicone or petroleum base grease could be applied at the valve-container interface to facilitate the assembly of the valve member 70 within the cell and also to facilitate the deflection of the peripheral edge of valve member 70 for venting gas from within the cell. If desired, a thin film of a sealant such as an asphaltic lacquer may be applied to at least a portion of the valve-container interface so as to seal such portion thereby limiting the venting of internal gas to any remaining unsealed portions or at the valve-rod interface.

The top edge 84 of container 60 is curled inwardly to provide a support flange for annular gasket 86 which could be made from polyethylene, polypropylene, nylon, paper, or the like.

The cell proper (i.e., raw cell), with the gasket 86 seated on the top edge flange of container 60, is then encased within an outer cell assembly including an outer tubular non-corrodible jacket 88 suitably made of a fibrous material, such as kraft paper. The upper end of the tubular jacket 88 extends beyond the gasket 86 and is locked in engagement with the outer peripheral edge of an annular top cover plate 90. Prior to engaging jacket 88 to cover plate 90, a metallic electrode terminal cap 92 is positioned over current collector rod 66 and is provided with an outwardly flanged lower end 94 that rests upon gasket 86. The locked engagement between the top cover plate 90 and the jacket 88 causes the plate 90 to bear down upon gasket 86 and thus assures that the gasket 86 is tightly compressed in place between the cover plate 90 and top edge 84 of container 60. The outer peripheral edge of a metallic bottom disc 96, in electronic contact with the bottom surface 98 of conductive container 60, is locked in engagement with the lower end of tubular jacket 88. This bottom disc 96 serves as one of the electrode terminals of the cell.

It is to be understood that the dimensions of the flapper vent valve of this invention should be selected such that when the valve is inserted into a container, the valve will assume in the container a cupped configuration without edge gaps or wrinkles. This unidirectional sealing means will permit any gas developed inside the container to vent at the valve-container interface and/or the valve-rod interface while excluding the ingress of gases, i.e., oxygen, from the atmosphere which could cause wasteful corrosion of the active metal electrode of the cell.

EXAMPLE 1

Eighty cylindrical zinc chloride dry cells, each having an outer diameter of 1.25 inches (3.18 cm), and a height of 2.875 inches (7.30 cm), were constructed as generally shown in FIG. 4 but with a paper gasket under the crimp. The anode of each cell consisted of a zinc cylindrical container having therein a cathode depolarizer mix composed of manganese dioxide, carbon black and an electrolyte composed of aqueous zinc chloride. A thin, bibulous paper coated with a gel paste surrounded the cathode depolarizer mix thereby separating the mix from the internal wall of the zinc container. A carbon collector rod having a diameter of 0.313 inch (0.789 cm) was disposed within the center of the mix with its top portion projecting above the mix. A flat solid neoprene washer (Durometer 60-40) measuring 1.31 inches (3.33 cm) outside diameter, 0.25 inch (0.635 cm) inside diameter and 0.187 inch (0.475 cm) thick, was pressed over the carbon rod and inserted into the zinc container having an internal diameter of 1.213 inches (3.18 cm). The neoprene washer or flapper vent valve assumed the shape as shown in FIG. 4. A film of non-melting petroleum based grease of medium consistency (Plastilube No. 3, manufactured by Parr, Inc.) was applied to the upper, inner surface of the zinc container where contacted by the neoprene flapper vent valve and to the carbon rod where contacted by the neoprene flapper vent valve. The subsealed cells were assembled into four cell series connected lantern batteries (Eveready No. 1209 made by Union Carbide) using plastic cases as described in U.S. Pat. No. 3,650,841. The outer case for the cells was not gas-tight and, therefore, was not a factor to be considered in determination of the subseal quality. For comparison purposes, an additional control lot of 80 cells were assembled into batteries, said batteries being identical in all respects to the experimental batteries except that the subseal of the individual cells were the standard commercial type comprising a cardboard collar covered by a poured asphalt layer. In both lots of cells, a standard commercial carbon electrode rod with some permeability to gas was employed.

Ten experimental batteries and ten control lot batteries were placed on elevated temperature shelf storage for 3 months at 45° C. and 10 of the former batteries and 10 of the latter batteries were stored for 9 weeks at 54° C. On the 45° C. shelf test and the 54° C shelf test, the current maintenance of the two lots was essentially identical. High temperature current maintenance is a very sensitive indicator of seal performance since it is related to separator moisture content which is, in turn, related to seal effectiveness (moisture loss).

The resulting of these comparison tests showed that the flapper vent subseal of this invention provides a static (long time, low pressure) seal quality equal to that obtained by the conventional asphalt subseals and in addition it can be surmised that under an electrical abuse situation, such as charging, where gas would be generated at a rate beyond the capacity of the normal carbon electrode to vent, the asphalt subseals would rupture while the flapper vent subseals of this invention would simply lift to release the pressure and then would reseat to seal the cell.

What is claimed is:

1. A galvanic cell comprising a container having an open end and an inner disposed anode; a depolarizer-cathode within said container; a porous separator disposed between said anode and said cathode; an electrolyte wetting said depolarizer-cathode; a current collector rod embedded within and projected above said depolarizer-cathode; and a resealable flapper vent valve disposed concentrically about the current collector rod over the depolarizer-cathode and contacting the inner wall of the container so as to provide a vent at the valve-container interface for releasing excessive gas pressure within the container, said resealable flapper vent valve comprising a resilient, deformable cupped annulus having an opening at its center through which the top of the current collector rod passes, contacts and projects above, and having its peripheral edge segment deflected upwardly such that at least the bottom peripheral edge of the annulus contacts the inner wall of the container.

2. The galvanic cell of claim 1 wherein the container is made of a consumable anode material and thus functions as the anode of the cell.

3. The galvanic cell of claim 2 wherein a film of grease is disposed along at least a portion of the flapper vent valve and current collector rod interface.

4. The galvanic cell of claim 2 wherein a film of grease is disposed along at least a portion of the flapper vent valve and container interface.

5. The galvanic cell of claim 3 wherein a film of grease is disposed along at least a portion of the flapper vent valve and current collector rod interface.

6. The galvanic cell of claim 2 wherein a film of sealant is disposed at least along a portion of the flapper vent valve and current collector rod interface.

7. The galvanic cell of claim 2 wherein a film of sealant is disposed at least along a portion of the flapper vent valve and container interface.

8. The galvanic cell of claim 7 wherein a film of sealant is disposed at least along a portion of the flapper vent valve and current collector rod interface.

9. The galvanic cell of claim 2 wherein the anode is zinc, the depolarizer-cathode comprises manganese dioxide and the current collector rod is carbon.

10. The galvanic cell of claim 1 wherein the flapper vent valve is made of a material selected from the group consisting of neoprene, polyurethane, polyvinyl chloride, polyethylene and polypropylene.

11. The galvanic cell of claim 1 wherein the flapper vent valve is made of a cellular plastic material.

12. The galvanic cell of claim 1 wherein the flapper vent valve is made of a copolymer of butadiene and styrene.

13. The galvanic cell of claim 10 wherein the flapper vent valve is made of neoprene.

* * * * *